United States Patent [19]

Kelly et al.

[11] Patent Number: 4,862,496

[45] Date of Patent: Aug. 29, 1989

[54] ROUTING OF NETWORK TRAFFIC

[75] Inventors: Francis P. Kelly; Richard J. Gibbens, both of Cambridge; Peter B. Key, Woodbridge; Paul A. Turton, London; Roger R. Stacey, Basingstoke; Martin J. Whitehead, Woodbridge, all of England

[73] Assignee: British Telecommunications public limited company, Great Britain

[21] Appl. No.: 942,323

[22] Filed: Dec. 16, 1986

[30] Foreign Application Priority Data

Dec. 18, 1985 [GB] United Kingdom ................. 8531138

[51] Int. Cl.⁴ ............................................. H04M 7/00
[52] U.S. Cl. .................................... 379/221; 340/827
[58] Field of Search ................. 379/221, 220; 340/827

[56] References Cited

U.S. PATENT DOCUMENTS

| | | | |
|---|---|---|---|
| 3,394,231 | 7/1968 | Hopper et al. | 379/134 |
| 3,536,842 | 10/1970 | Ewin et al. | 379/197 |
| 4,004,103 | 1/1977 | Liu et al. | 379/274 |
| 4,348,554 | 9/1982 | Asmuth | 379/113 |
| 4,669,113 | 5/1987 | Ash et al. | 379/221 |
| 4,704,724 | 11/1987 | Krishman et al. | 379/221 |

FOREIGN PATENT DOCUMENTS 1078302 of 1967 United Kingdom.
1089633 11/1967 United Kingdom.

OTHER PUBLICATIONS

"Managing a Network That Won't Sit Still", Mocenigo and Tow, *AT&T Bell Laboratories Record*, Aug. 1984, pp. 23-26.

*Primary Examiner*—Thomas W. Brown
*Attorney, Agent, or Firm*—Nixon & Vanderhye

[57] ABSTRACT

A method and apparatus for routing traffic in a circuit switched network. A call between two nodes interconnected by a direct link is first offered to the direct route, and if that is blocked it is offered to a currently nominated two-link alternative route between the two nodes. If that route is busy, the call is lost, and a randomly chosen two-link route is assigned to be the new current nominated alternative route. The strategy is particularly effective because it is simple, available routes are quickly located and once one available route is found, that same route is used for rerouting further calls until it is full. Trunk reservation protection is applied on alternative routes.

27 Claims, 2 Drawing Sheets

ROUTING OF NETWORK TRAFFIC

FIELD OF THE INVENTION

The present invention relates to telecommunications networks and methods. In particular it relates to routing traffic in a circuit-switched network with full or multiple interconnection.

BACKGROUND AND SUMMARY OF THE INVENTION

With the introduction of new switching technologies in recent years, it is no longer necessary for telephone traffic (or voice and data traffic on an integrated network) to be routed along a fixed origin-destination route. One of the early steps towards more flexible routing was the introduction of automatic alternative routing, which allows traffic on overloaded direct routes to be diverted via alternative, pre-assigned routes. The introduction of stored program controlled (SPC) exchanges and common channel signalling have opened up the possibility of increased flexibility.

A number of routing strategies have been put forward. In a strategy proposed by Bell-Northern Research, calls are routed directly if possible; if not they are routed on an alternative two link path recommended by a central processor. The central processor chooses the recommended path probabilistically with a probability proportional to the number of free circuits on each route after subtracting a reserved number of circuits (a trunk reservation parameter). Each exchange is linked to the central processor and transmits data on availability to the central processor every 5 to 10 seconds. For large networks, the amount of information received by the central processor each 5-10 second period is large. The central processor decides on alternative routes for calls on the basis of information gathered on average about 5 seconds ago.

Another similar system, proposed by Forestier and Lottin, avoids the use of a central processor. Exchanges communicate with one another to find the least congested alternative route for traffic. Again, there is delay in gathering this information and the system is complex.

U.S. Pat. No. 3,536,842 discloses a telephone network in which a history record is kept of the success or failure of calls extended over a trunk route to each terminating office that is reached via that route. The history record is consulted on subsequent calls, and used to affect decisions as to choice for route for subsequent calls. In the method disclosed in that Patent, the history record is a complex one, which carries information relating to the relative success history of each route to each destination. When a first preferred trunk route fails, the next best trunk route is selected from the history record.

This approach appears attractive at first sight, but in practice results in a need for very substantial processing capability at each node, and the processing overhead involved can lead to a loss of calls in a heavily loaded network.

Further work, largely theoretical, proposes various decentralised routing strategies, referred to as learning automata. In one of the simplest of them, the probabilities of success for a call along each possible path are updated after every call has been processed. If there are r routes from exchange i to exchange j, the r routes will be attempted in a random order with changing probabilities. Many such schemes may be more sophisticated than this. The amount of processing capacity required for these strategies can be relatively large, particularly for the more sophisticated ones.

According to a first aspect of the present invention there is provided a method of routing traffic in a circuit switched network, comprising offering calls between an origin node and a destination node to one or more preferred routes, and if the said preferred routes are not available, offering at least one alternative route, wherein calls are offered to one or more current nominated alternative routes until such route is not available, at which point the said current nominated alternative route is changed.

In accordance with the first aspect of the present invention there is provided a simple and efficient routing scheme in which blocked calls on a first choice route are directed to a current nominated alternative route, the same alternative route being chosen until such route is no longer available. The current nominated alternative route is then changed in a way which is random in the sense that the search technique does not restrict unduly the patterns of routing that can emerge, taking into account the various alternative routes used by different source-destination pairs. In particular, it is desirable that the search technique used should not bias the routing pattern that emerges towards any predefined routing pattern and/or away from any pattern which might under certain network operating conditions be desirable. Thus a choice may be made among the various available alternative routes according to, for example, a stochastic, pseudo random, or cyclic mechanism.

The present invention also provides apparatus for routing traffic through a circuit-switched network comprising processors at respective nodes, each processor being adapted to offer calls at a node to one or more preferred routes and if said preferred routes are not available, offering alternative routes wherein calls are offered to one or more current nominated alternative routes until such route is not available, at which point the said current nominated alternative route is changed.

BRIEF DESCRIPTION OF THE DRAWINGS

A number of preferred embodiments of the invention will now be described with reference to the accompanying drawings, in which.

DETAILED DESCRIPTION

Figure 1:
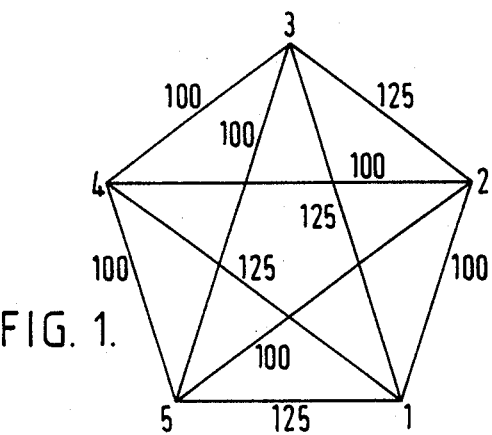
FIG. 1 is a schematic diagram of a fully interconnected five node network with link capacities labelled.

Referring first to FIG. 1, suppose the exchange at node 1 has a call for node 2, but the direct route between the two nodes is busy. The exchange at node 1 maintains a record (set) of the three; alternative two-link routes that are available, via nodes 3, 4 and 5 respectively, and maintains a record of which of these three alternative routes is the current nominated alternative route (this will normally be the last used alternative route, unless the previous overflowing call was blocked). Trunk reservation is used on each link. Without trunk reservation, a link could become very busy with alternatively routed calls, causing calls which would otherwise be directly routed along the link to be re-routed over two-links (or blocked), which is undesirable on cost and other grounds. Trunk reservation is a widely used technique and will not be described in detail here. The exchange at node 1 then checks whether the current nominated alternative route between nodes 1 and 2 has any available circuits, after subtracting the trunk reservation parameters for the two links from the actual number of free circuits for those links. For example, the current nominated route may be via node 5. The capacity of the link between nodes 1 and 5 is 125 circuits and its trunk reservation parameter (TRP) is, say, 10. Node 1 stores these figures and also the number of circuits currently in use. The link between nodes 1 and 5 is available for alternative routing if the sum of the circuits in use and the TRP is less than 125.

In order to find whether the second link between node 5 and 2 is available, node 1 sends a message to node 5. Node 5 includes processing means which holds details of the capacity of the link between nodes 5 and 2 (100 circuits), the TRP (10) of this link, and the number of busy circuits on the link. Again, the link is available if the capacity exceeds the number of busy circuits and the TRP. A message is transmitted by node 5 to node 1 to indicate whether or not the link is available. This message need be only a single bit in length.

If both links are available, the call is routed via node 5. For as long as there are available circuits on the route via node 5, this alternative route is chosen. In a preferred embodiment of the invention, if the current nominated alternative route is not available for a call then the call is lost, and the next time a call overflows from link (1, 2) it is offered either to any one of the two-link routes via nodes 3, 4 and 5, or, if desired, to one of such two-link routes, but not the one which has just overflowed (i.e., the call is offered only to one of the two-link routes via node 3 or node 4).

The choice among the three alternatives routes (i.e., the replacement nomination for the unavailable current nominated alternative route) may be made in accordance with any desired criteria and need not be weighted in accordance with a history record of each alternative route. The newly chosen alternative route is then nominated as the current alternative route, to which subsequent calls not capable of direct routing are offered.

In an alternative embodiment of the invention, if the current nominated alternative route is not available for a call, the same call is offered to a new alternative route, and again the current alternative route is updated.

This method has been found to be highly successful and it has three advantages over prior art systems. First, the strategy for selecting alternative routes is a very simple one which can be easily implemented and uses only a small amount of processor time. Secondly, there is no significant delay between checking whether a route is available and assigning a call to the route so the information used is always up-to-date. Thirdly, suitable routes are pinpointed and once they have been used successfully once, they continue to be used whenever calls cannot be routed on direct routes, until they are full (allowing for trunk reservation). Thus, it is necessary to find a new alternative route relatively infrequently. That the results are so satisfactory from such a simple system is very surprising; the trend has been to develop more and more sophisticated strategies, for example so as to choose the best possible route each time re-routing is necessary. Development and implementation costs are high for such strategies and yet performance of the simple system described above has been found generally to be at least as good.

The above example involved a very small network of five nodes; in most applications there will be far more, but the method may be operated in the same way.

In a fully interconnected network with N nodes, a call may arise between nodes i and j (i, j = 1,2, ... ,N, i≠j). The call is offered first to the direct link (i,j), but if all the circuits on this link are in use then the call is offered to the current alternative route, through node k(i,j). The alternatively routed call is only accepted if doing so leaves at least $t(i,k(i,j))$ circuits free on link $(i,k(i,j))$ and $t(k(i,j),j)$ circuits free on link $(k(i,j),j)$. If the call is accepted on the alternative route, the indicator k(i,j) is left unaltered and calls continue to be offered to this route whenever alternative routing is necessary. If the call ils not accepted on the alternative route, then the call is lost and the indicator k(i,j) is reset to a value chosen at random from the set $\{1,2, \ldots ,N\} - \{i,j\}$.

To illustrate the high performance achieved by the scheme described above, consider the network of FIGS. 1 to 3 where the number of nodes N is 5. The trunk reservation parameter is 10 for all links, ie $t(i,j) = 10$, for all pairs (i,j). These parameters are chosen so that if direct traffic alone would receive a grade of service or 3.75% from a link then the grade of service received by direct traffic when that link is used as part of alternative routes is no worse than 7.5%.

Figure 2:
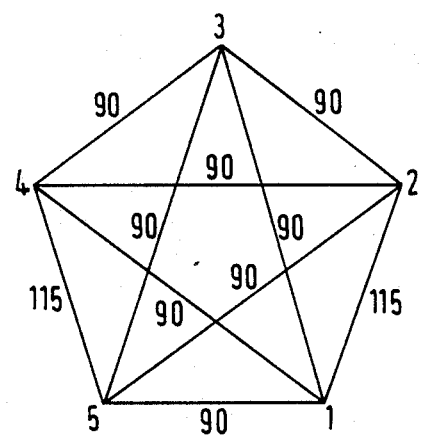
FIGS. 2 and 3 are schematic diagrams of the same network with two possible patterns of unidirectional offered traffic.

FIG. 2 shows a possible offered traffic pattern for the network of FIG. 1. Note that the traffic offered to links (1,2) and (4,5) is higher than can reasonably be accommodated by direct routing over those links. However, by comparing the offered traffic with the capacities indicated in FIG. 1 and allowing for a TRP of 10, it can be seen that there is spare capacity along the routes 1 - 3 - 2 and 4 - 1 - 5. If this mismatch of offered traffic and capacity could be predicted in advance then it would be possible to designate 1 - 3 - 2 and 4 - 1 - 5 as alternative routes for overflow traffic from links (1,2) and (4,5) respectively. The aim of the present dynamic routing method is automatically to seek to such beneficial patterns of carried traffic as offered traffic, and possibly capacity, varies.

Table I shows values calculated in a computer simulation of the network of FIG. 1 for grades of service received by the various offered traffic streams and the patterns of carried traffic using the method outlined above under the offered traffic pattern shown in FIG. 2. Table I shows that 8% of the traffic between nodes 1 and 2 is routed via node 3, and 9% of the traffic between nodes 4 and 5 is routed via node 1. The method in accordance with the invention has effectively found and utilized the spare capacity along the alternative routes 1 - 3 - 2 and 4 - 1 - 5.

TABLE I

| Source Destination Pair | % of calls routed directly | % of calls routed via tandem nodes 1-5 | | | | | % of calls lost |
|---|---|---|---|---|---|---|---|
| | | 1 | 2 | 3 | 4 | 5 | |
| 1-2 | 84 | — | — | 8 | 2 | 2 | 5 |
| 1-3 | 100 | — | 0 | — | 0 | 0 | 0 |
| 1-4 | 100 | — | 0 | 0 | — | 0 | 0 |
| 1-5 | 100 | — | 0 | 0 | 0 | — | 0 |
| 2-3 | 100 | 0 | — | — | 0 | 0 | 0 |
| 2-4 | 97 | 0 | — | 1 | — | 0 | 2 |
| 2-5 | 98 | 0 | — | 1 | 0 | — | 2 |

TABLE I-continued

| Source Destination Pair | % of calls routed directly | % of calls routed via tandem nodes 1-5 | | | | | % of calls lost |
|---|---|---|---|---|---|---|---|
| | | 1 | 2 | 3 | 4 | 5 | |
| 3-4 | 98 | 1 | 0 | — | — | 0 | 1 |
| 3-5 | 98 | 1 | 0 | — | 0 | — | 1 |
| 4-5 | 85 | 9 | 0 | 1 | — | — | 5 |

Overall blocking = 1.9%.

Figure 3:
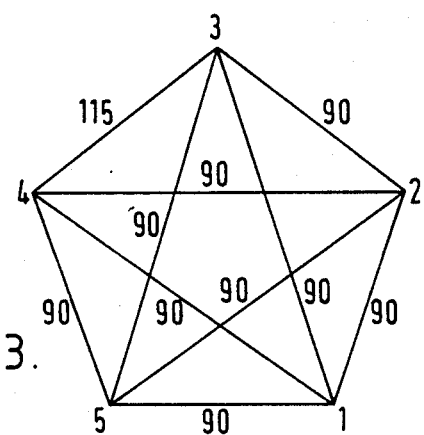

Table II gives the corresponding estimates for the offered traffic pattern shown in FIG. 3. In this case useful extra capacity has been found between nodes 3 and 4, via node 1, which carries 9% of the traffic between nodes 3 and 4.

TABLE II

| Source Destination Pair | % of calls routed directly | % of calls routed via tandem nodes 1-5 | | | | | % of calls lost |
|---|---|---|---|---|---|---|---|
| | | 1 | 2 | 3 | 4 | 5 | |
| 1-2 | 98 | — | — | 2 | 0 | 0 | 0 |
| 1-3 | 100 | — | 0 | — | 0 | 0 | 0 |
| 1-4 | 100 | — | 0 | 0 | — | 0 | 0 |
| 1-5 | 100 | — | 0 | 0 | 0 | — | 0 |
| 2-3 | 100 | 0 | — | — | 0 | 0 | 0 |
| 2-4 | 97 | 1 | — | 0 | — | 0 | 2 |
| 2-5 | 97 | 1 | — | 1 | 0 | — | 2 |
| 3-4 | 83 | 9 | 2 | — | — | 1 | 5 |
| 3-5 | 98 | 1 | 0 | — | 0 | — | 1 |
| 4-5 | 98 | 2 | 0 | 0 | — | — | 1 |

Overall blocking = 1.2%.

(Percentage within the tables are estimated to the nearest per cent. Thus 100 indicates a percentage value above 99.5% while 0 indicates a percentage value below 0.5%).

The above estimates illustrate the scheme's performance for a very simple network and for just two particular patterns of offered traffic; dynamic routing as described in this example can perform similarly for a wide range of asymmetric and symmetric networks and over a wide range of overload conditions.

In the computer simulation used to generate Tables II and III, the search for a new alternative route between two nodes when the current nominated alternative route has failed on the previous call takes place stochastically through all alternatives. Once a suitable alternative route has been found it is used repeatedly for rerouting so that routes used successfully are re-used. Moreover, for the network as a whole, the random reset procedure searches stochastically through the space of alternative routing patterns, with a bias towards especially beneficial patterns of carried traffic. It is believed that the fact that such a simple scheme can perform so well is related to features of the transient response of large circuit-switched networks.

In many networks, it may be satisfactory for all routes to have an equal probability of being chosen. However, in other networks there is preferably a bias towards or against certain routes. For example, certain routes may be especially likely to have spare capacity, or some alternative routes may be forbidden. Probabilities for the alternative routes can be chosen accordingly.

In the above example, each time that the current alternative route for a particular source-destination pair was reset, the choice of a new current alternative route was made randomly or stochastically. It will be noted however, that, even if each individual choice is made by a pseudo-random or cyclic mechanism, the overall routing pattern (i.e. the entire collection of current alternative routes used by all the source destination pairs in the network) will still be random. This is because even when a cyclic list is used, the movement through the list is randomly driven by the call arrival processes, which are of their nature stochastic.

In some networks, one particular link may have much larger offered traffic and capacity than associated links. This can create problems if there is a large overflow from the high capacity link say link (i,j), since, for example, an intermediate or tandem node selected for rerouting as described above may have to deal with large number of calls in quick succession. To overcome this in a further preferred embodiment of the invention, a subset of s possible two-link alternative routes is chosen from the N alternative routes available. These s two-link alternative routes each constitute a current alternative route, and the s current alternative routes are used in cyclic fashion. A small number s ($s<N$) of indicators ($k_1, k_2, \ldots, k_s$) is used, together with a pointer, which is an element of the set $\{1,2,\ldots s\}$. If a call is blocked on the direct link (i,j) it is rerouted on the alternative route through node $k_r$, if that route is available taking into account trunk reservation. If that route is not available the call is lost and the indicator $k_r$ is replaced by a value chosen from the set $\{1,2,\ldots,N\}-\{i,j\}$. Whether or not the alternative route through node $k_r$ is available the pointer r is updated to r(mod s) +1. Thus if a sequence of calls is blocked on the direct link (i, j) they are offered, in cyclic fashion, to the alternative routes through nodes ($k_1,k_2,..,k_s$). When an alternative route within the cycle is found unavailable its place within the preferred subset of tandem nodes ($k_1,k_2\ldots,k_s$) is taken by another route through an alternative tandem node, and the cycle continues. Note that the cycle may include two or more incidents of a particular route so some routes may carry more than 1/s of the overflow traffic.

The method has been described for a network which is fully-interconnected, but it can readily be adapted for a network which is not fully-interconnected. Two simple alternative adaptations are as follows:

(i) to implement the method as described with a missing link treated as a link of capacity zero. Traffic for a source-destination pair corresponding to such a link would automatically be offered to a two-link route - the one used previously if the last such attempt had been successful, and a randomly chosen two-link route otherwise.

(ii) to replace a missing link by a virtual link, constructed by reserving a number of circuits on one or more two-link paths. This would result in a network of virtual links which is fully-interconnected.

In certain circumstances, for example if a local exchange is interconnected with two main exchanges, there will be two or more direct routes for calls from an exchange. In accordance with a further preferred embodiment of the invention, if one direct route is blocked the call is offered to each other direct route. The order in which the call is offered to the direct routes may be determined in accordance with any desired criteria, for example a pre-defined order may be utilised. Only if all direct routes are blocked is an alternative indirect route selected.

Figure 4:
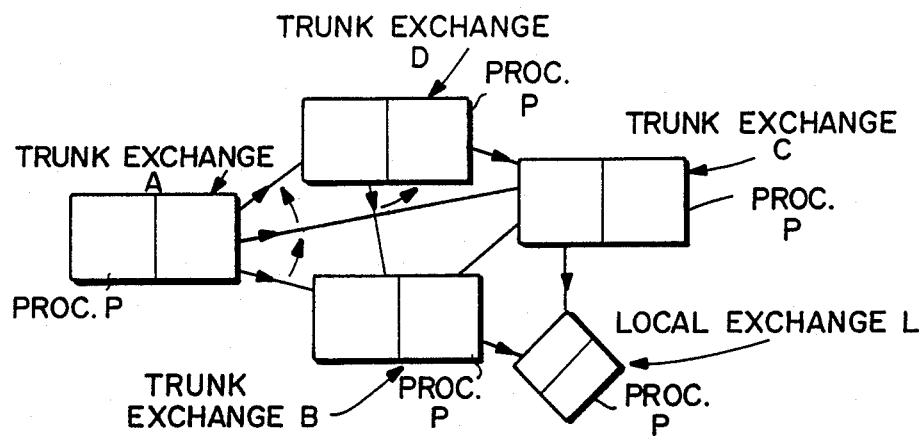
FIG. 4 is a schematic diagram of an alternative network which is not fully interconnected.

FIG. 4 illustrates the use of the method in accordance with the invention in such a network. In FIG. 4, node A is the origin node, and node L the destination node. As shown in FIG. 4, nodes A, B, C and D are trunk exchanges, and node L is a local exchange, each of which is a stored program controlled exchange having a respective processor P. Node L is connected to two trunk exchanges B and C. Calls from trunk exchange A to local exchange L therefore have two preferred main network routes, via nodes B and C. If these are both busy, a third choice is used via the current nominated alternative (i.e. indirect) route. In the embodiment illustrated the currently nominated alternative route is via tandem node D. A routing table is held at node A, which holds values defining the sequence in which calls are offered to the available choices of route. Table III is an example of a suitable routing table showing the sequence of preferred routes, and trunk reservation parameters at node A for calls to node L.

TABLE III

|  | Route |  | TR |
|---|---|---|---|
| Fixed | 1 | B | 0 |
| choices | 2 | C | 3 |
| Dynamic choice | 3 | D | 5 |

Each call offered from node A to node L first attempts connection via node B. Because this is the most preferred route, the trunk reservation parameter is 0.

If the route via node B is not available, connection via node C is attempted. In the example illustrated, the trunk reservation parameter on route 2 via node C is 3, indicating that this route is slightly less preferred than route 1.

If connection is not possible via either of preferred routes 1 or 2, an alternative route is attempted, via the current nominated alternative route, (currently via node D in Taale III). From node D, only the two direct routes are used, via nodes B and C respectively, the route via node B being tried first.

It will of course be understood that FIG. 4 illustrates only a small part of a large network comprising many nodes, for example nodes E, F, etc., as illustrated in Table IV.

TABLE IV

| Dynamic choice list |
|---|
| . |
| . |
| . |
| D ← |
| E |
| F |
| . |
| . |

If a call attempted via node D fails due to congestion, then node D is replaced in the routing table by a new tandem node (node E in the example illustrated) selected from a dynamic choice list. In the embodiment illustrated in TaAble IV, the choice of the next node to try is made cyclically, simply by stepping through the subsequent available tandem nodes defining the various alternative routes in sequence.

In alternative embodiments however choice as to the next node to select from those available may be made by a truly random or pseudo-random method, or by choosing to step through the dynamic choice list in some other predefined sequence.

An example of this arises when it is desired to utilise the same dynamic choice list for a number of destination nodes from a given source nodes. In such a case, it may be desirable to allocate a different pointer to the dynamic choice list held at the source node for each destination node. Each pointer may step through the dynamic choice list in accordance with different rules. For example, if the number of times in the dynamic choice list is a prime number, it may be desirable to arrange for each pointer to step through the list with a different increment.

Figure 5:
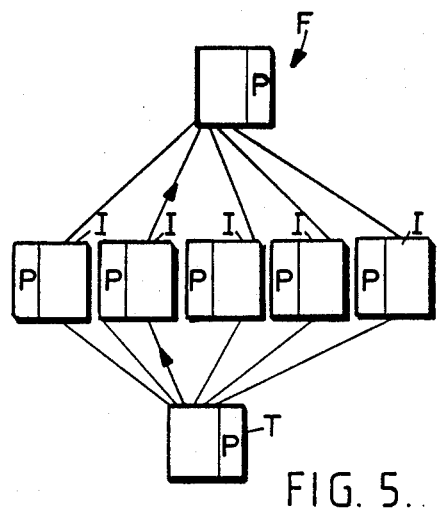
FIG. 5 is a schematic diagram showing the routing of international calls.

FIG. 5 illustrates an alternative aspect of the invention, which is applicable to the routing of international calls from a trunk exchange T to a foreign destination F. The trunk exchange is connected to a number of possible international gateway exchanges I, each of which has a route to the foreign countries.

Each of T, F, and I comprising an SPC exchange having a respective processor P. In this case, there exists no direct or preferred route from the trunk exchange to the foreign destination. This case may be likened to the case illustrated in FIG. 1, but in which the direct route between the source and destination nodes has a capacity of 0. In this aspect of the invention, the last used route through a particular gateway is the current nominated route, and continues to be used, until that route becomes unavailable. At this point, another gateway is selected of the five available. The selection may be carried out according to any desired criteria, for example at random, cyclically, or according to fixed weighting criteria, such as cost criteria. The new route is made the current nominated alternative route, and future calls to the foreign destination are routed via that route, until that route in turn becomes unavailable.

Accordingly, in a further aspect of the invention, there is provided a method of routing traffic in a circuit switched network, comprising offering calls between an origin node and a destination node to one of a plurality of routes, wherein calls are offered to a current nominated route until such route is not available, at which point the current nominated route is changed. Again, in a preferred embodiment of the aspect of the invention just described, a call is lost if circuits are not free on the current nominated route. In alternative embodiments however, a call blocked on the current nominated route may be offered to one or more further alternative routes, the current nominated route being changed whenever the current nominated route is unable to accept a call.

In practice we have found that in many networks, there is little advantage to the network in offering calls to further alternative routes, and the additional processing necessary results usually in an undesirable sacrifice of simplicity.

Thus, it is generally preferable for efficient network operation for a call at a particular source node n to a given destination node be lost if the first alternative route offered is blocked. When the next call arrives at node n for the same destination node, the availability of any direct route to the destination node is checked (or each of the direct routes if the call can be directly routed via two or more alternative nodes). If a direct route to the destination node is not available, the current nominated alternative route is tried. If, because a call has failed, it is decided to change the current nominated alternative route, then a selection is preferably made amongst all the available alternatives, including the route offered to the previous call (which was blocked). Alternatively, the route which was unavailable for the last call can be excluded from the search.

Trunk reservation is advantageous as, for example, it ensures that direct links are unlikely to become blocked with alternatively routed calls, thus forcing calls which could otherwise be routed directly on the links to be routed on alternative two link routes. However, it is possible to use different methods to achieve similar results, although again simplicity may be sacrificed.

It will of course be appreciated that a wide range of other specific implementations may be realized, within the scope of the appended claims.

In particular it will be understood that the term circuit switched network as used herein is intended to mean any network in which calls are allocated at their outset to a particular route, and the term is intended to include within its scope networks comprising virtual circuits, for example networks in which no fixed bandwidth is allocated to each call on its chosen route, for the duration of the call, but the route is itself fixed.

It will be understood also that the method in accordance with the invention may be used not only in the routing of calls for which the origin and destination nodes indicated above correspond respectively with the exchanges of the calling and originating subscribers, but also in cases where either or both of the origin and destination nodes are simply intermediate nodes on a more complex overall route.

We claim:

1. A method of routing traffic in a circuit-switched network, said method comprising:
    offering calls between an origin node and a destination node to one or more pre-assigned preferred routes, and
    if the or each of said one or more preferred routes is not available, offering said calls to at least one alternative route, wherein calls continue to be offered to one or more current nominated alternative routes until the or one of said current nominated alternative routes is not available, at which point a replacement nomination for the unavailable current nominated alternative route is made from a set of alternative routes to the destination node,
    said current nominated alternative route being an alternative route which the origin node immediately offers to a call blocked on the pre-assigned preferred route.

2. A method of routing traffic in a circuit-switched network, comprising:
    offering calls between an origin node and a destination node to one or more preferred routes, and
    if the or each of said one or more preferred routes is not available, offering at least one alternative route,
    wherein calls are offered to one or more current nominated alternative routes until the or one of said current nominated alternative routes is not available, at which point a replacement nomination for the unavailable current nominated alternative route is made from a set of alternative routes to the destination node,
    wherein a call between an origin node and a destination node which is blocked on the said one or more preferred routes is offered to only one current nominated alternative route, and if the said one current nominated alternative route is not available, the call is lost, and the replacement nomination is made.

3. A method of routing traffic in a circuit-switched network, comprising:
    offering calls between an origin node and a destination node to one or more preferred routes, and
    if the or each of said one or more preferred routes is not available, offering at least one alternative route,
    wherein calls are offered to one or more current nominated alternative routes until the or one of said current nominated alternative routes is not available, at which point a replacement nomination for the unavailable current nominated alternative route is made from a set of alternative routes to the destination node,
    wherein calls between an origin node and a destination node which are blocked on the said one or more preferred routes are offered to a first current nominated alternative route, and if the said first current nominated alternative route is not available said replacement nomination is made, and said calls are offered to a second current nominated alternative route.

4. A method of routing traffic in a circuit-switched network, comprising:
    offering calls between an origin node and a destination node to one or more preferred routes, and
    if the or each of said one or more preferred routes is not available, offering at least one alternative route,
    wherein calls are offered to one or more current nominated alternative routes until the or one of said current nominated alternative routes is not available, at which point a replacement nomination for the unavailable current nominated alternative route is made from a set of alternative routes to the destination node,
    wherein successive replacement nominations are made by stepping cyclically through the set of alternative routes.

5. A method of routing traffic in a circuit-switched network, comprising:
    offering calls between an origin node and a destination node to one or more preferred routes, and
    if the or each of said one or more preferred routes is not available, offering at least one alternative route,
    wherein calls are offered to one or more current nominated alternative routes until the or one of said current nominated alternative routes is not available, at which point a replacement nomination for the unavailable current nominated alternative route is made from a set of alternative routes to the destination node,
    wherein a set of current nominated alternative routes is chose, and each successive call which is blocked on said one or more preferred routes is offered to a respective cyclically selected member of the set, and wherein if the respective member to which a call is so offered is not available, that member is replaced in the set of current nominated alternative routes by a said replacement nomination.

6. A method of routing traffic in a circuit-switched network, comprising:
    offering calls between an origin node and a destination node to one or more preferred routes, and
    if the or each of said one or more preferred routes is not available, offering at least one alternative route,
    wherein calls are offered to one or more current nominated alternative routes until the or one of said current nominated alternative routes is not available, at which point a replacement nomination for the unavailable current nominated alternative route is made from a set of alternative routes to the destination node,
wherein the or each of said one or more preferred routes is a single link route and the alternative routes are two-link routes.

7. A method of routing traffic in a circuit-switched network, comprising:
offering calls between an origin node and a destination node to one or more preferred routes, and
if the or each of said one or more preferred routes is not available, offering at least one alternative route,
wherein calls are offered to one or more current nominated alternative routes until the or one of said current nominated alternative routes is not available, at which point a replacement nomination for the unavailable current nominated alternative route is made from a set of alternative routes to the destination node,
wherein links between pairs of nodes are assigned respective trunk reservation parameters, and an alternative route is available if, for each link of the route, the sum of current traffic and trunk reservation parameter is less than the capacity of the link.

8. A method of routing traffic in a circuit-switched network, comprising:
offering calls between an origin node and a destination node to one or more preferred routes, and
if the or each of said one or more preferred routes is not available, offering at least one alternative route,
wherein calls are offered to one or more current nominated alternative routes until the or one of said current nominated alternative routes is not available, at which point a replacement nomination for the unavailable current nominated alternative route is made from a set of alternative routes to the destination node,
wherein the replacement nomination is made such as to give equal weight to each of the said alternative routes.

9. A method of routing traffic in a circuit-switched network, comprising:
offering calls between an origin node and a destination node to one or more preferred routes, and
if the or each of said one or more preferred routes is not available, offering at least one alterative route,
wherein calls are offered to one or more current nominated alternative routes until the or one of said current nominated alternative routes is not available, at which point a replacement nomination for the unavailable current nominated alternative route is made from a set of alternative routes to the destination node,
wherein the replacement nomination is made on the basis as to which route is intrinsically likely to be available.

10. A method as claimed in claim 1, wherein the replacement nomination is made by a stochastic, pseudo-random or cyclic mechanism.

11. A method of routing traffic in a circuit-switched network, said method comprising:
offering calls between an origin node and a destination node to one of a plurality of routes,
wherein calls are and continue to be offered to one or more current nominated routes until the or one of said current nominated routes is not available, at which point a replacement nomination for the unavailable current nominated route is made from a set of said routes,
a current nominated route being an alternative route which the origin node immediately offers to a call blocked on previously offered routes.

12. A method of routing traffic in a circuit-switched network, comprising:
offering calls between an origin node and a destination node to one of a plurality of routes,
wherein calls are offered to one or more current nominated routes until the or one of said current nominated routes is not available, at which point a replacement nomination for the unavailable current nominated route is made from a set of said routes,
wherein if a call between an origin node and a destination node is blocked on the or a first of said one or more current nominated routes, the call is lost, and said replacement is made.

13. A method of routing traffic in a circuit-switched network, comprising:
offering calls between an origin node and a destination node to one of a plurality of routes,
wherein calls are offered to one or more current nominated routes until the or one of said current nominated routes is not available, at which point a replacement nomination for the unavailable current nominated route is made from a set of said route,
wherein if a desired call between an origin node and a destination node is not available on a first current nominated route, the call is offered to only one other current nominated route, and if the said other current nominated route is not available, the call is lost 14. A method as claimed in claim 11, wherein if a desired call between an origin node and a destination node is not available on a first current nominated route, the call is offered to a second current nominated route, and if the said second current nominated route is not available, the said call is offered to a third current nominated route.

15. A method of routing traffic in a circuit-switched network, comprising:
offering calls between an origin node and a destination node to one of a plurality of routes,
wherein calls are offered to one or more current nominated routes until the or one of said current nominated routes is not available, at which point a replacement nomination for the unavailable current nominated route is made from a set of said routes,
wherein successive replacement nominations are made by stepping cyclically through the set of alternative routes.

16. A method as claimed in claim 11, wherein a set of current nominated routes is chosen, and each successive call is offered to a respective selected member cyclically of the set, and wherein if the respective member to which a call is so offered is not available, that member is replaced in the set of current nominated routes by a said replacement nomination.

17. A method as claimed in claim 1, wherein the circuit-switched network is a virtual circuit network.

18. A method as claimed in claim 11, wherein the circuit-switched network is a virtual circuit network.

19. Apparatus for routing traffic through a circuit-switched network comprising:
a plurality of processors at respective nodes, the said processors being adapted to offer calls between their respective node and a destination node to one or more pre-assigned preferred routes and, if the one or each of said one or more preferred routes is not available, offering alternative routes, wherein calls are offered to one or more current nominated alternative routes until the or one of said current nominated alternative routes is not available, at which point a replacement nomination for the unavailable current nominated alternative route is made form a set of said alternative routes to the destination node, said current nominated alternative route being an alternative route which the origin node immediately offers to a call blocked on the pre-assigned preferred route.

20. Apparatus for routing traffic through a circuit-switched network comprising:

a plurality of processors at respective nodes, the said processors being adapted to offer calls between their respective node and a destination node to one or more preferred routes and if the one or each of said one or more preferred routes is not available, offering alternative routes, wherein calls are offered to one or more current nominated alternative routes until the or one of said current nominated alternative routes is not available, at which point a replacement nomination for the unavailable current nominated alternative route is made from a set of said alternative routes to the destination node, wherein each processor is adapted to offer a call which is blocked on the said preferred routes to only one current nominated route, and if the said current nominated route is not available, the call is lost, and said replacement nomination is made.

21. Apparatus for routing traffic through a circuit-switched network comprising:

a plurality of processor at respective nodes, the said processors being adapted to offer calls between their respective node and a destination node to one or more preferred routes and if the one or each of said one or more preferred routes is not available, offering alternative routes, wherein calls are offered to one or more current nominated alternative routes until the or one of said current nominated alternative routes is not available, at which point a replacement nomination for the unavailable current nominated alternative route is made from a set of said alternative routes to the destination node, wherein the or each of said one or more preferred routes in a single link route and the alternative routes are two-link routes.

22. Apparatus for routing traffic through a circuit-switched network comprising:

a plurality of processors at respective nodes, the said processors being adapted to continue to offer calls between their respective node and a destination node to one or more current nominated routes until the one or more of said current nominated routes is not available, at which point a replacement nomination for the unavailable current nominated route is made from a set of routes to the destination node, a current nominated route being an alternative route which the origin node immediately offers to a call blocked on previously offered routes.

23. Apparatus for routing traffic through a circuit-switched network comprising:

a plurality of processors at respective nodes, the said processors being adapted to offer calls between their respective node and a destination node to one or more current nominated routes until the one or more of said current nominated routes is not available, at which point a replacement nomination for the unavailable current nominated route is made from a set of routes to the destination node, wherein each processor is adapted to offer a call which is blocked on the or a first of said one or more current nominated routes to only one other current nominated route, and if the said other current nominated route is not available, the call is lost, and said replacement nomination is made.

24. Apparatus for routing traffic through a circuit-switched network comprising:

a plurality of processors at respective nodes, the said processors being adapted to offer calls between their respective node and a destination node to one or more preferred routes and if the one or each of said one or more preferred routes is not available, offering alternative routes, wherein calls are offered to one or more current nominated alternative routes until the or one of said current nominated alternative routes is not available, at which point a replacement nomination for the unavailable current nominated alternative route is made from a set of said alternative routes to the destination node, wherein successive replacement nominations are made by stepping cyclically through the set of alternative routes.

25. Apparatus for routing traffic through a circuit-switched network comprising:

a plurality of processors at respective nodes, the said processors being adapted to offer calls between their respective node and a destination node to one or more current nominated routes until the one or more of said current nominated routes is not available, at which point a replacement nomination for the unavailable current nominated route is made from a set of routes to the destination node, wherein successive replacement nominations are made by stepping cyclically through the set of alternative routes.

26. Apparatus for routing traffic through a circuit-switched network comprising:

a plurality of processors at respective nodes, the said processors being adapted to offer calls between their respective node and a destination node to one or more preferred routes and if the one or each of said one or more preferred routes is not available, offering alternative routes, wherein calls are offered to one or more current nominated alternative routes until the or one of said current nominated alternative routes is not available, at which point a replacement nomination for the unavailable current nominated alternative route is made from a set of said alternative routes to the destination node wherein the said processors are adapted to nominate a set of current nominated alternative routes, to successive calls which are blocked on said one or more preferred routes to respective cyclically selected members of the set, and , if a respective member to which a call is offered is not available, to replace said respective member in the set by a said replacement nomination.

27. Apparatus for routing traffic through a circuit-switched network comprising:
a plurality of processors at respective nodes,
the said processors being adapted to offer calls between their respective node and a destination node to one or more current nominated routes until the one or more of said current nominated routes is not available, at which point a replacement nomination for the unavailable current nominated route is made from a set of routes to the destination node, wherein the said processors are adapted to nominate a set of current nominated routes, to offer each successive call to a respective cyclically selected member of the set, and, if a respective member to which a call is offered is not available, to replace said respective member in the set by a said replacement nomination.

* * * * *